H. CRUIKSHANK.
Saddle-Tree.
No. 168,145. Patented Sept. 28, 1875.
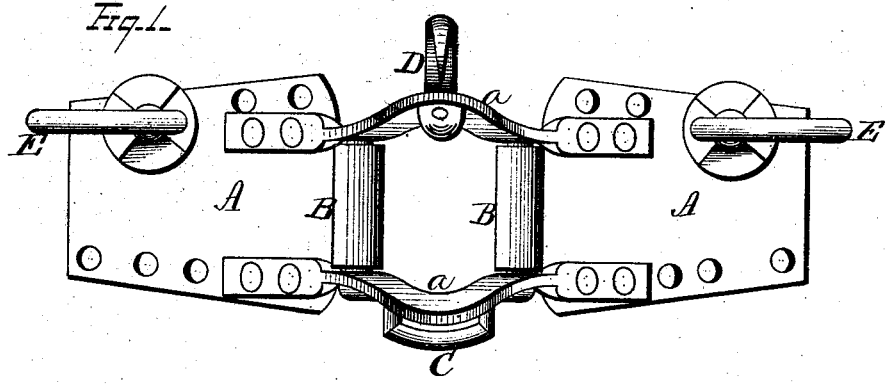
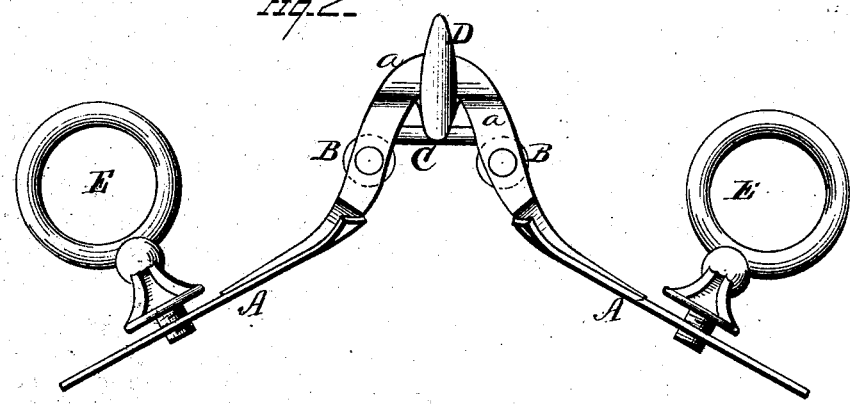

UNITED STATES PATENT OFFICE.

HARRY CRUIKSHANK, OF CECILTON, MARYLAND.

IMPROVEMENT IN SADDLE-TREES.

Specification forming part of Letters Patent No. 168,145, dated September 28, 1875; application filed July 1, 1875.

*To all whom it may concern:*

Be it known that I, HARRY CRUIKSHANK, M. D., of Cecilton, in the county of Cecil and State of Maryland, have invented certain new and useful Improvements in Saddle-Trees; and I do hereby declare the following to be a full, clear, and exact description of the invention, such as will enable others skilled in the art to which it pertains to make and use it, reference being had to the accompanying drawings, which form part of this specification.

My invention relates to an improvement in harness-saddle trees.

In the drawing is shown an isometric view of my invention, which consists in the following parts and combinations, as hereinafter specified and claimed, wherein—

A are two plates, from which rise the bows or arches $a$. B are rollers, trunnioned or journaled just above the point of juncture between the plates A and arches $a$. C is a loop for the attachment of the crupper-strap. D is the ordinary hook for the check-rein. E are common loops or terret-rings for the passage of the reins, which are attached to the plates A, in the usual manner.

The operation is as follows: The parts, combined as shown in the drawing, are fixed and adjusted upon the harness-girt, in the usual manner. The back-strap, passing over the friction-rollers B between the arches $a$, which serve as guides, is permitted a free and easy lateral motion, whereby strain is relieved or equalized, and the draft made correspondingly easier. Not only is this accomplished by my invention, but also, by the open character of my device at that portion passing over the spinal column of the animal wearing it, lightness and ventilation are secured, the result of which is freedom from any liability to gall or irritate.

What I claim is—

The metallic harness or jockey saddle tree composed of back-plates A A, sharply curved or arched bars $a\ a$, to which are secured the crupper-loop C, and check-hook D, and large friction-rollers B, all constructed and united as described, whereby a simple, strong, and durable ventilated tree is secured.

In testimony that I claim the foregoing I have hereunto set my hand this 19th day of May, 1875.

HARRY CRUIKSHANK, M. D.

Witnesses:
   J. C. CROOKSHANK,
   H. W. BLACK.